(12) United States Patent
Lumsden

(10) Patent No.: US 6,643,357 B2
(45) Date of Patent: Nov. 4, 2003

(54) DISTRIBUTED REDIRECT SERVER

(75) Inventor: John E. Lumsden, Toronto (CA)

(73) Assignee: Nortel Networks Limited, St. Laurent (CA)

( * ) Notice: Subject to any disclaimer, the term of this patent is extended or adjusted under 35 U.S.C. 154(b) by 526 days.

(21) Appl. No.: 09/735,501

(22) Filed: Dec. 14, 2000

(65) Prior Publication Data

US 2003/0026410 A1 Feb. 6, 2003

(51) Int. Cl.[7] .................................................. H04M 1/64
(52) U.S. Cl. ................................... 379/88.22; 379/198
(58) Field of Search ........................... 379/88.22, 88.25, 379/198, 225, 232

(56) References Cited

U.S. PATENT DOCUMENTS

| | | | | |
|---|---|---|---|---|
| 5,870,546 A | * | 2/1999 | Kirsch | ................... 395/200.33 |
| 6,434,143 B1 | * | 8/2002 | Donovan | ..................... 370/356 |
| 6,466,966 B1 | * | 10/2002 | Kirsch et al. | ................ 709/203 |
| 6,477,150 B1 | * | 11/2002 | Maggenti et al. | ............ 370/312 |
| 6,512,818 B1 | * | 1/2003 | Donovan et al. | ......... 377/88.17 |
| 6,577,622 B1 | * | 6/2003 | Schuster et al. | ............. 370/352 |
| 6,584,093 B1 | * | 6/2003 | Salama et al. | .............. 370/351 |
| 6,584,490 B1 | * | 6/2003 | Schuster et al. | ............ 709/200 |

* cited by examiner

*Primary Examiner*—Creighton Smith
(74) *Attorney, Agent, or Firm*—G. Ronald Bell & Associates; G. Ronald Bell

(57) ABSTRACT

The present invention provides a system with a redirect functionality that removes the potential of a bottleneck inherent with a central redirect server. In a communications system according to the present invention, the central redirect server is eliminated in favor of a distributed redirect server. This distributed redirect server is distributed to, and hosted on, telephony access nodes (TANs) in the system. This configuration resolves both the problem of a potential bottleneck and provisioning of redundant redirect server capability.

10 Claims, 3 Drawing Sheets

DISTRIBUTED REDIRECT SERVER

FIELD OF INVENTION

The present invention relates, in general, to communications systems and relates, more specifically, to the provision of services on such systems within a network.

BACKGROUND OF INVENTION

In a communications system, a multinode messaging system may appear as a single system to the network while internally, it must distribute calls between its internal nodes. Such a system may employ a property called redirect. The redirect property is available in such protocols as the Session Initiation Protocol (SIP). Using redirect, a call is sent to a common externally known address of the messaging system. Those calls are then redirected to the node that will actually terminate the call. Since the redirection is a central-type function, it is normally placed on a centralized element of back-end hardware.

FIG. 1 illustrates such a prior art system 100 that makes use of a redirect server to terminate a call. Redirect server 140 receives a message signal from switch 120. The switch 120 may be a telephony switch such as a private branch exchange (PBX) switch. Depending on the availability of requested resources, the redirect server 140 will pass the message signal to one of telephony access nodes (TANs) 160 via an appropriate path. The TANs 160 terminate message signaling. The redirect server 140 distributes messages for the TANs 160.

There are two main drawbacks with a system such as that illustrated in FIG. 1. The first drawback is that the redirect server, due to its centralized nature, can cause a bottleneck in cases of increased traffic. Second, if a malfunction should occur in the redirect server, the entire system could cease to function properly, so a second redundant redirect server must be provisioned for high availability systems.

Therefore, it would be desirable to have a method and system that would address the above shortcomings of the centralized redirect server.

SUMMARY OF INVENTION

It is an object of the present invention to provide a system that removes the potential limitation of a bottleneck inherent with a central redirect server plus provides an inherent redundancy strategy.

The above object is achieved by eliminating the central redirect server. The redirection functionality is instead distributed across all telephony access nodes (TANs). This configuration resolves the problem of scalability since, as TANs are added for increased capacity, the redirect server capacity is augmented as well.

According to a first aspect of the invention, there is provided a communications system comprising: a switch for accepting incoming calls; a plurality of telephony access nodes for terminating said incoming calls; a distributed redirect server hosted on each of said plurality of telephony access nodes; and a load balancing unit for directing said incoming calls from said switch to one of the plurality of telephony access nodes, said plurality of telephony access nodes being connected to a back end cluster.

According to another aspect of the invention, there is provided a method of terminating a call in a communications system, said communications system comprising a switch, a plurality of telephony access nodes, a distributed redirect server, and a load balancing unit, the method comprising the steps of: generating an incoming call at said switch; directing said incoming call from said switch via said load balancing unit to said distributed redirect server for termination at one of said telephony access nodes; verifying, at said distributed redirect server, whether said one telephony access node has sufficient resources to answer said incoming call; and terminating said incoming call at said one telephony access node.

According to a further aspect of the invention, there is provided a method of terminating a call in a communications system, said communications system comprising a switch, a plurality of telephony access nodes, a distributed redirect server, and a load balancing unit, the method comprising the steps of: accepting an incoming call at said switch; directing said incoming call from said load balancing unit to said distributed redirect server for termination at a first one of said telephony access nodes; verifying, at said distributed redirect server, whether said first telephony access node has sufficient resources to answer said incoming call; determining whether a second one of said telephony access nodes has sufficient resources to answer said incoming call when said step of verifying has concluded that said first telephony access node does not have sufficient resources to answer said incoming call, wherein any of said redirect servers would have knowledge of available resources of any other TAN, and that said TAN could send a redirect message back to the switch and would direct it to send the Invite message to a specific TAN with available resources; and terminating said incoming call at said second telephony access node.

BRIEF DESCRIPTION OF THE DRAWINGS

Embodiments of the present invention will be further described with respect to the accompanying drawings in which.

DETAILED DESCRIPTION OF THE INVENTION

Figure 1:
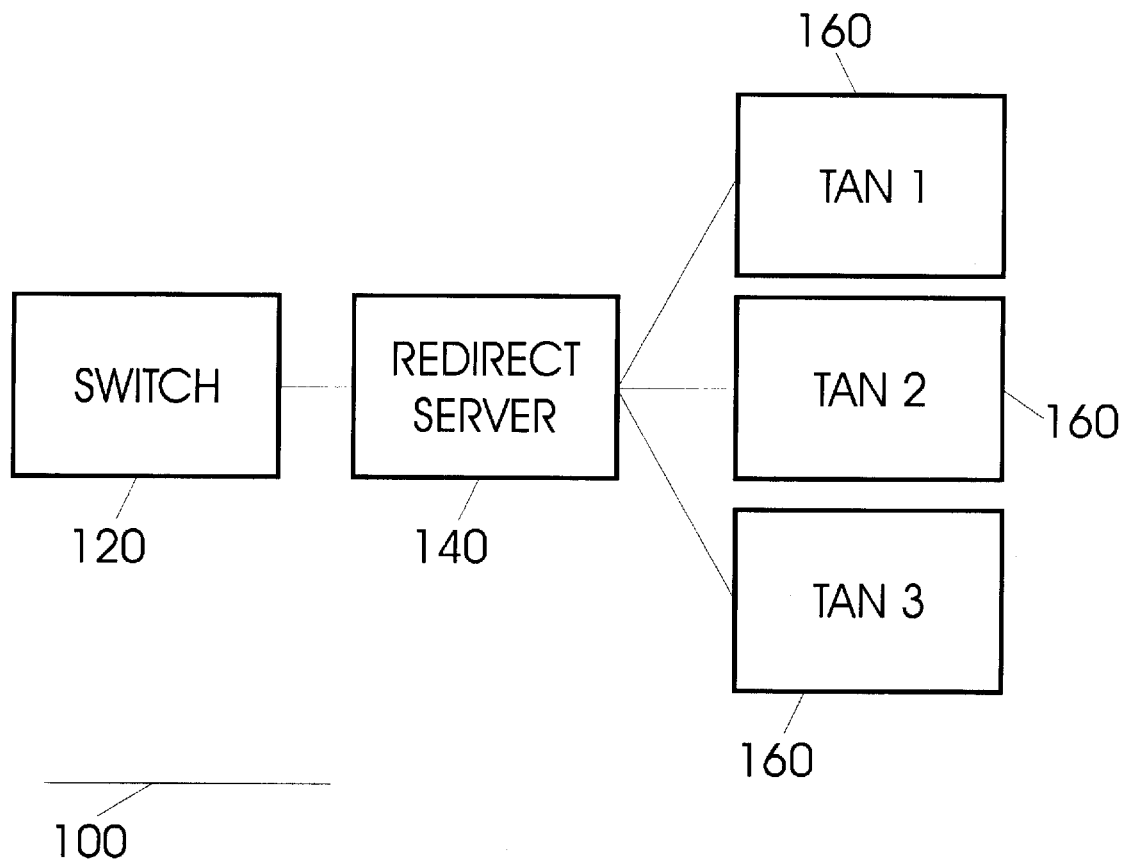
FIG. 1 illustrates a prior art system that makes use of a redirect server to terminate a call.
Figure 2:
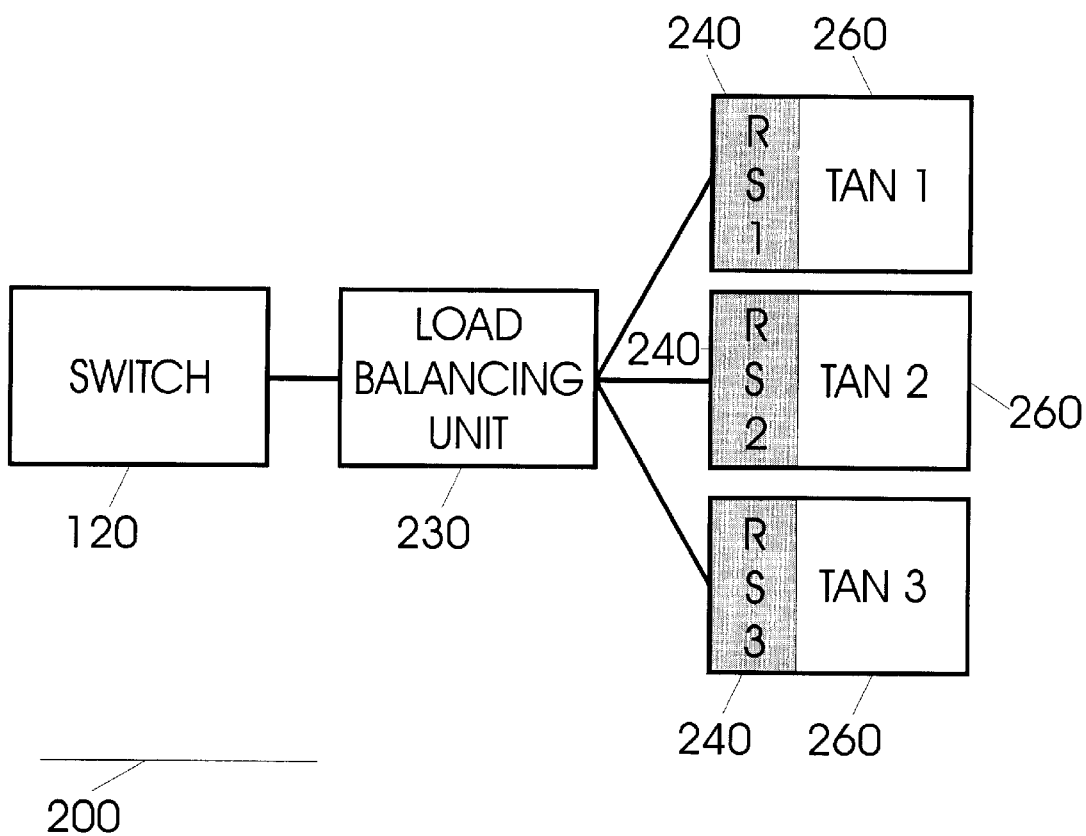
FIG. 2 illustrates a system with a distributed redirect functionality according to an embodiment of the present invention.

With reference to FIG. 2, a system 200 is shown which employs a distributed redirect server 240 wherein the redirect server functionality of prior art systems is distributed at each location of a TAN 260. A load balancing unit 230 is inserted before the distributed redirect server 240 in order to accept message calls from switch 120. The load balancing unit 230 is an unintelligent hardware device that directs incoming calls to one of the redirect servers 240 for subsequent termination at one of the TANs 260.

As can be seen in FIG. 2, the TANs 260 not only terminate media and signaling from the PBX switch, but they also host each element of the distributed redirect server 240.

As mentioned previously, the distributed redirect server 240 is configured to present the messaging system as a single entity to switch 120 by means of a single external address. However, incoming message calls must still be terminated at the appropriate TAN 260. Therefore, the distributed redirect server 240 requires that each of the TANs 260 broadcast their resource availability status to every other TAN in the system. If a particular TAN does not have the resources to answer an incoming call, it needs to understand that another TAN in the system does have the necessary resources available.

The communication of resource availability status will be accomplished via an Internet Protocol (IP) multicast. Each TAN will report via IP multicast to every TAN in the system whether it has a status of Free or Busy. A TAN may transition from Free to Busy when its number of free channels drops to a value of i. This value of i may be equal to 2 so as to avoid conditions where a TAN showing a status of Free is actually busy as other calls are terminating on it while updating its status. A TAN may transition from Busy to Free as the number of free channels increases to a value j. This value j may be 4, in order to provide some hysterisis and prevent a TAN from oscillating from Free to Busy on a single call, causing excessive status multicast traffic. The actual values of i and j may be optimized on heuristics which may be based on traffic patterns as well as on the number on TANs. Each TAN will create a "map" of the status of the other TANs in the system on the basis of the information from the received multicast messages.

Figure 3A:
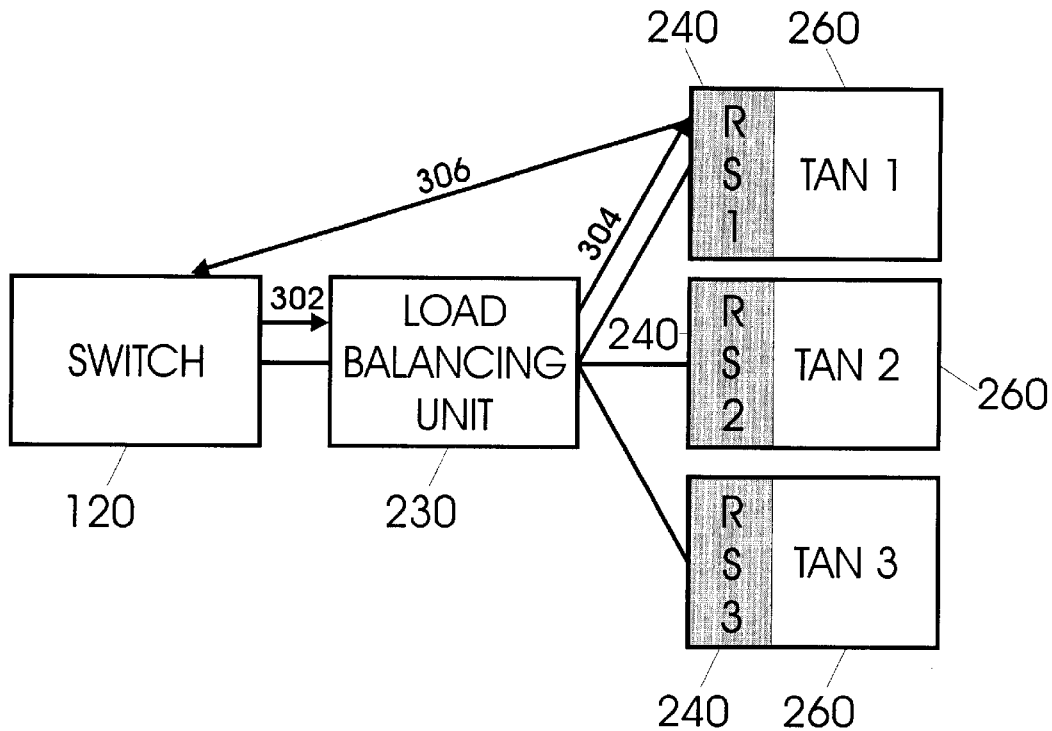
FIG. 3A illustrates steps in a call termination procedure in accordance with the system of FIG. 2.

An example of a call termination will now be described with respect to FIG. 3A. In this figure, step 302 represents a step whereby switch 120 issues an Invite message to the external virtual IP address of the system. Load balancing unit 230 receives the Invite message and forwards it at random to one of the TANs (TAN 1 in this case). At this point, TAN 1 verifies whether it has the necessary resources to answer the call. The result of this determination is sent, as shown in step 306, back to the switch 120. In this case, TAN 1 has the necessary resources and answers the call.

Redundancy is provided in the following manner. First, there are multiple instances of the redirect server 240. Second, the load balancing unit 230 maintains a view of the 'sanity' of each of the redirect servers. If a redirect server was to fail, the load balancing server would note it and stop distributing calls to that node. Therefore, failure of any single redirect server will not impact the overall system.

Figure 3B:
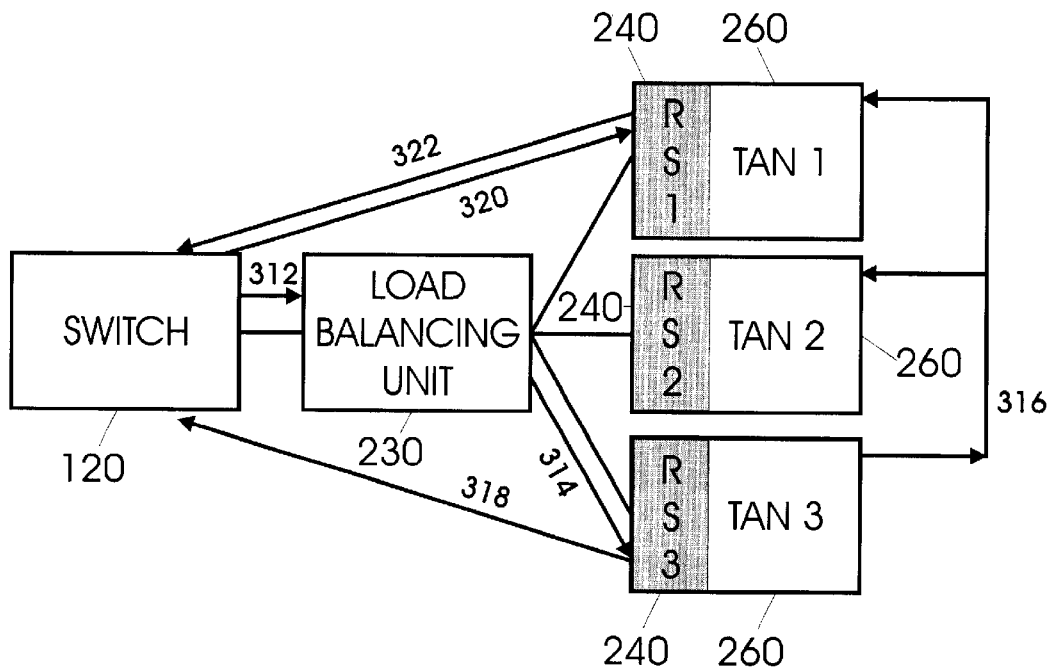
FIG. 3B illustrates steps in another call termination procedure in accordance with the system of FIG. 2.

FIG. 3B illustrates a situation wherein the TAN to which a call is forwarded does not have the necessary resources. Similar to the previous figure, step 312 represents a step whereby switch 120 issues an Invite message to the external virtual IP address of the system. Load balancing unit 230 receives the Invite message and forwards it at random to one of the TANs (in this case, TAN 3). However, in this case TAN 3 has no available resources. Prior to the arrival of this Invite message, in step 316, TAN 3 would have multicast its transition to a Busy state, so that every other TAN in the system could update its map of TAN status. In this particular TAN3's map indicates that TAN 1 is available. Consequently, in step 318, TAN 3 informs the switch 120 that it should send an invitation to the specific IP address of TAN 1 for this particular call, not to the virtual IP address of the entire system. At this point, step 320 illustrates the switch 120 issuing that invitation directly to the redirect server 240 associated with TAN 1, thereby bypassing load balancing unit 230. Since it is already known that TAN 1 has the necessary resources to answer the call, step 322 shows the confirmation of the ability of TAN 1 to terminate the call.

In a case where a particular TAN discovers another TAN with idle resources, the call is usually relayed to the respective TAN via the redirect server. If none of the TANs in the system has available resources, the invited TAN may return a busy signal. Alternatively, the call may be placed in a queue employing the first-in-first-out methodology. The call will then be terminated on any subsequently available TAN by routing the call to the TAN with the first available free channel.

What is claimed is:

1. A communications system comprising:
   a switch for accepting incoming calls;
   a plurality of telephony access nodes for terminating said incoming calls;
   a distributed redirect server hosted on each of said plurality of telephony access nodes; and
   a load balancing unit for directing said incoming calls from said switch to one of the plurality of telephony access nodes, said plurality of telephony access nodes being connected to a back end cluster.

2. A communications system according to claim 1 wherein the distributed redirect server determines whether one of said plurality of telephony access nodes has sufficient resources to terminate one of said incoming calls.

3. A communications system according to claim 1 wherein the connection between the plurality of telephony access nodes and the cluster of back end nodes uses Internet Protocol.

4. A method of terminating a call in a communications system, said communications system comprising a switch, a plurality of telephony access nodes, a distributed redirect server, and a load balancing unit, the method comprising the steps of:
   generating an incoming call at said switch;
   directing said incoming call from said switch via said load balancing unit to said distributed redirect server for termination at one of said telephony access nodes;
   verifying, at said distributed redirect server, whether said one telephony access node has sufficient resources to answer said incoming call; and
   terminating said incoming call at said one telephony access node.

5. A method of terminating a call in a communications system, said communications system comprising a switch, a plurality of telephony access nodes, a distributed redirect server, and a load balancing unit, the method comprising the steps of:
   generating an incoming call at said switch;
   directing said incoming call from said load balancing unit to said distributed redirect server for termination at a first one of said telephony access nodes;
   verifying, at said distributed redirect server, whether said first telephony access node has sufficient resources to answer said incoming call;
   determining whether a second one of said telephony access nodes has sufficient resources to answer said incoming call when said step of verifying has concluded that said first telephony access node does not have sufficient resources to answer said incoming call;
   sending a message from said second telephony access node to said switch indicating the ability of said second telephony access node to terminate said incoming call;
   sending a message from said switch directly to the distributed redirect server associated with said second telephony access node; and
   terminating said incoming call at said second telephony access node.

6. A method according to claim 5 wherein, prior to said determining step, a status of each of said telephony access nodes is multicast to the others of said telephony access nodes.

7. A method according to claim 5 wherein said step of determining comprises a step of consulting a resource availability status map which indicates the status of each of said telephony access nodes.

8. A method according to claim 7 wherein said resource availability status map is compiled based on Internet Protocol multicast messages sent by each one of said plurality of telephony access nodes.

9. A method according to claim 7 wherein each one of said telephony access nodes has a status of either Free or Idle.

10. A method according to claim 7 wherein said resource availability status map is maintained at each of said telephony access nodes.

* * * * *